(12) United States Patent
Farmanbar et al.

(10) Patent No.: US 9,072,116 B2
(45) Date of Patent: Jun. 30, 2015

(54) SYSTEMS AND METHODS FOR REDUCING COMPLEXITY IN MODULATION CODING SCHEME (MCS) ADAPTATION

(71) Applicant: FutureWei Technologies, Inc., Plano, TX (US)

(72) Inventors: Hamidreza Farmanbar, Ottawa (CA); Aaron Callard, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 120 days.

(21) Appl. No.: 13/787,599

(22) Filed: Mar. 6, 2013

(65) Prior Publication Data

US 2014/0254495 A1    Sep. 11, 2014

(51) Int. Cl.
*H04W 72/10* (2009.01)
*H04W 72/12* (2009.01)

(52) U.S. Cl.
CPC ..................................... *H04W 72/12* (2013.01)

(58) Field of Classification Search
CPC .............. H04B 7/024–7/0452; H04L 27/0008; H04L 5/1453; H04L 27/0012; H04L 27/2601; H04W 1/0001; H04W 52/262; H04W 72/12
USPC ......... 370/310, 312, 315, 328–329, 338–339, 370/352; 455/436–437, 443–444, 448–449, 455/463, 13.1
See application file for complete search history.

(56) References Cited

U.S. PATENT DOCUMENTS

| | | | |
|---|---|---|---|
| 2005/0190745 A1* | 9/2005 | Western et al. | 370/352 |
| 2009/0279467 A1 | 11/2009 | Ji | |
| 2010/0046658 A1* | 2/2010 | Yosoku et al. | 375/267 |
| 2010/0265929 A1 | 10/2010 | Liao et al. | |
| 2011/0194419 A1* | 8/2011 | Lee et al. | 370/242 |
| 2011/0274152 A1* | 11/2011 | Seyama | 375/224 |

(Continued)

FOREIGN PATENT DOCUMENTS

CN    101601311 A    12/2009

OTHER PUBLICATIONS

International Search Report and Written Opinion received in International Application No. PCT/CN2014/072913 mailed Jun. 4, 2014, 8 pages.

(Continued)

*Primary Examiner* — Charles C Jiang
*Assistant Examiner* — Mohamed Kamara
(74) *Attorney, Agent, or Firm* — Slater & Matsil, L.L.P.

(57) ABSTRACT

The computational complexity of MCS adaptation for linear and non-linear MU-MIMO can be reduced by avoiding QR decomposition during subsequent stages of MCS adaptation. For instance, QR decomposition can be avoided in later stages of MCS adaptation by computing an instant upper right triangular matrix ($R_1$) directly from an earlier upper right triangular matrix (R) and an earlier unitary matrix (U), which were obtained during a previous stage of MCS adaptation. As such, the instant upper right triangular matrix ($R_1$) is obtained without performing QR decomposition on an instant Hermitian matrix ($H_1^H$), thereby allowing MCS adaptation to be performed for the new user group with less complexity. Additionally, computational complexity of MCS adaptation for linear MU-MIMO can be further reduced by avoiding matrix inversion during subsequent stages of MCS adaptation.

23 Claims, 6 Drawing Sheets

(56) References Cited

U.S. PATENT DOCUMENTS

2012/0250553 A1 10/2012 Huschke et al.
2013/0142290 A1* 6/2013 Farmanbar et al. ........... 375/343

OTHER PUBLICATIONS

International Search Report received in International Application No. PCT/CN2014/072913 mailed Jun. 10, 2014, 4 pages.

* cited by examiner

SYSTEMS AND METHODS FOR REDUCING COMPLEXITY IN MODULATION CODING SCHEME (MCS) ADAPTATION

TECHNICAL FIELD

The present disclosure relates generally to wireless communications, and, in particular embodiments, to systems and methods for reducing complexity in modulation coding scheme (MCS) adaptation.

BACKGROUND

Modern communications networks utilize modulation coding scheme (MCS) adaptation to match signal transmission parameters to conditions of a radio link. Specifically, MCS adaptation is used to predict the coding rate for users during uplink/downlink scheduling, and is particularly useful when pairing users during multi-user multiple input multiple output (MU-MIMO) downlink scheduling. One drawback is that MCS adaptation becomes increasingly complex as users are added to the network. For instance, conventional MCS adaptation for MU-MIMO downlink scheduling can approach an order of cubic the number of transmit antenna (e.g., $O(N^3)$ for a system having N transmit antennas). Accordingly, techniques and mechanisms for reducing the complexity of MCS adaptation are desired in order to better preserve network resources, e.g., processing or otherwise.

SUMMARY OF THE INVENTION

Technical advantages are generally achieved by embodiments of this disclosure, which describe systems and methods for reducing complexity during MCS adaptation.

In accordance with an embodiment, a method for user selection is provided. In this example, the method includes selecting users for an initial user group and computing initial modulation coding schemes (MCSs) for users in the initial user group. Computing the initial MCSs for the users in the initial user group may include performing an initial QR decomposition operation for the initial user group. The method further includes adding a new user to the initial user group to obtain a new user group and computing a new MCS for the new user in the new user group, wherein computing the new MCS for the new user includes calculating the new MCS directly using information obtained from the initial QR decomposition operation and without performing a QR decomposition operation for the new user group. An apparatus for performing this method is also provided.

In accordance with another embodiment, another method for user selection is provided. In this example, the method includes selecting users for an initial user group, performing QR decomposition on an initial Hermitian matrix ($H^H$) associated with the initial user group to obtain an initial unitary matrix (Q) and an initial upper triangular matrix (R), adding a new user to the initial user group to obtain a new user group, and performing modulation coding scheme (MCS) adaptation for the new user group. The new user group associated with a new Hermitian matrix ($H_1^H$), and performing MCS adaptation for the new user group includes computing a last column ($r_1$) of a new upper triangular matrix ($R_1$) corresponding to the new Hermitian matrix ($H_1^H$) directly from at least the initial unitary matrix (Q) and the initial upper triangular matrix (R), thereby obtaining the new upper triangular matrix ($R_1$) without performing QR decomposition on the new Hermitian matrix ($H_1^H$), and calculating MCSs for users in the new user group in accordance with the new upper triangular matrix ($R_1$).

In accordance with yet another embodiment, another method for user selection is provided. In this example, the method includes adding a first new user to an initial user group to obtain a first new user group. The first new user group associated with a first new Hermitian matrix ($H_1^H$). The method further includes computing a first new unitary matrix ($Q_1$) and a first new upper triangular matrix ($R_1$) corresponding to the first new Hermitian matrix ($H_1^H$), adding a second new user to the initial user group to obtain a second new user group, the second new user group associated with a second new channel matrix ($H_2$), computing a second new unitary matrix ($Q_2$) and a second new upper triangular matrix ($R_2$) corresponding to the second new Hermitian matrix ($H_2^H$), adding both the first new user and the second new user to the initial user group to obtain a third new user group, and performing modulation coding scheme (MCS) adaptation for the third new user group. The third new user group associated with a third new channel matrix ($H_{12}$), and performing MCS adaptation for the third new user group includes computing a last column ($r_{12}$) of a third new upper triangular matrix ($R_{12}$) corresponding to the third new channel matrix ($H_{12}$) directly from at least the first new unitary matrix ($Q_1$), the first new upper triangular matrix ($R_1$), the second new unitary matrix ($Q_2$), and the second new upper triangular matrix ($R_2$), thereby obtaining the third new upper triangular matrix ($R_{12}$) without performing QR decomposition on the third new Hermitian matrix ($H_{12}^H$), and predicting MCSs for users in the new user group in accordance with the third new upper triangular matrix ($R_{12}$). An Apparatus for performing this method is also provided.

In accordance with yet another embodiment, another method for user selection is provided. In this example, the method includes selecting users for an initial user group for which an initial channel matrix (H) corresponds, performing QR decomposition on an initial Hermitian matrix ($H^H$) associated with the initial user group to obtain an initial unitary matrix (Q) and an initial upper triangular matrix (R), inverting the upper triangular matrix (R) to obtain an initial inverted upper triangular matrix ($R^{-1}$), adding a new user to the initial user group to obtain a new user group, and performing modulation coding scheme (MCS) adaptation for the new user group. The new user group is associated with a new Hermitian matrix ($H_1^H$), and performing MCS adaptation for the new user group includes computing a new unitary matrix ($Q_1$) and a new upper triangular matrix ($R_1$) corresponding to the new Hermitian matrix ($H_1^H$), computing a last column ($s_1$) of a new inverted upper triangular matrix ($R_1^{-1}$) corresponding to the new upper triangular matrix ($R_1$) directly from at least the new unitary matrix ($Q_1$) and a last column ($r_1$) of the new upper triangular matrix ($R_1$), thereby obtaining the new inverted upper triangular matrix ($R_1^{-1}$) without performing matrix inversion on the new upper triangular matrix ($R_1$), and predicting MCSs for users in the new user group in accordance with the new inverted upper triangular matrix ($R_1^{-1}$). An apparatus for performing this method is also provided.

SUMMARY OF THE FIGURES

For a more complete understanding of the present disclosure, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of this disclosure and are not necessarily drawn to scale.

DETAILED DESCRIPTION OF ILLUSTRATIVE EMBODIMENTS

Figure 1:
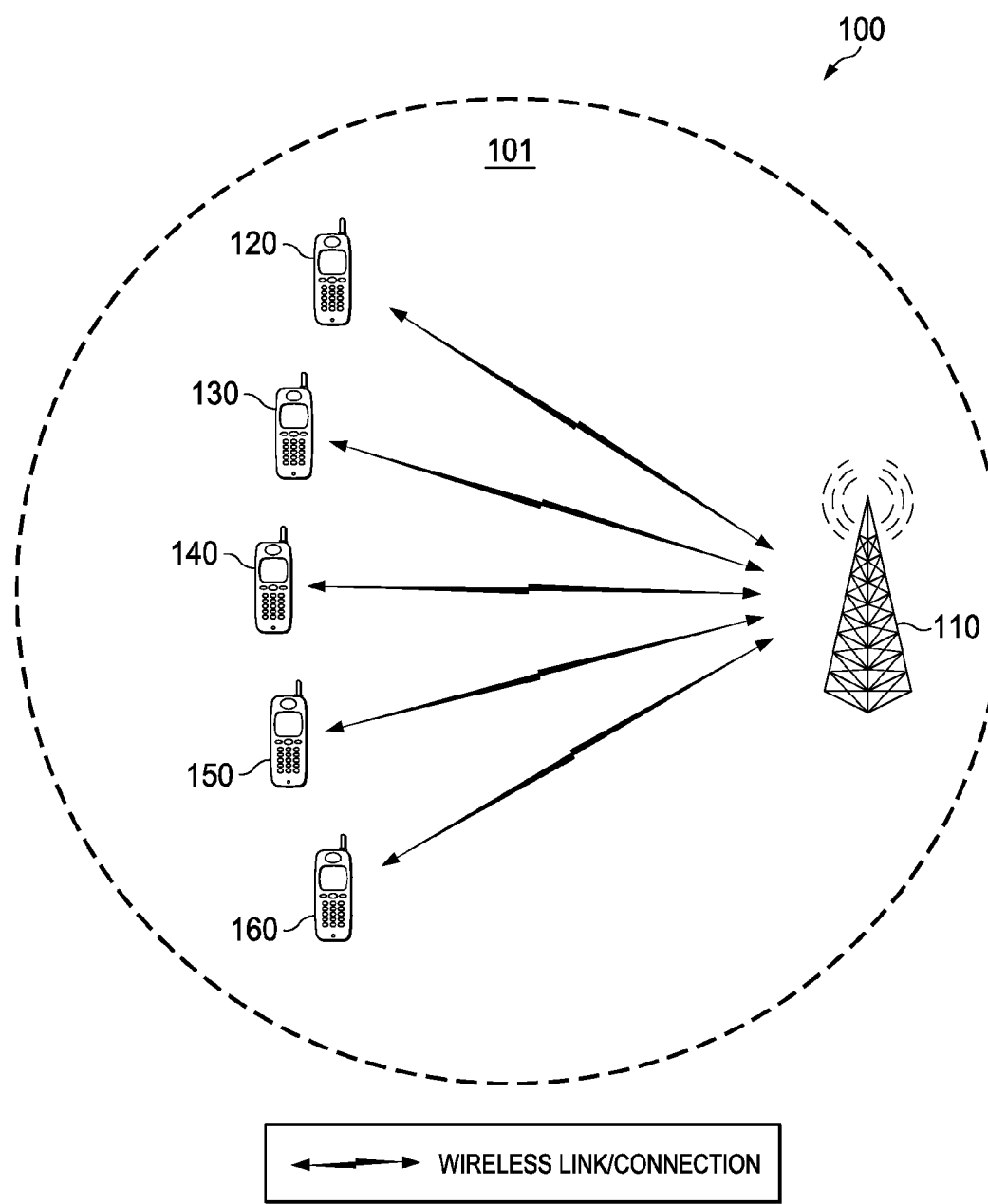
FIG. 1 illustrates a wireless communications network.

The making and using of the presently disclosed embodiments are discussed in detail below. It should be appreciated, however, that the present invention provides many applicable concepts that can be embodied in a wide variety of specific contexts. The specific embodiments discussed are merely illustrative of specific ways to make and use the invention, and do not limit the scope of the invention.

Much of the complexity associated with MCS adaptation for MU-MIMO is attributable to processing related to QR decomposition, which is a computation performed to calculate MCSs for users in a user group. More specifically, QR decomposition is performed on a Hermitian MU-MIMO channel matrix ($H^H$) corresponding to a new user group in order to obtain an upper-right triangular matrix (R). The upper-right triangular matrix (R) (or an inverse thereof) is used to calculate the MCSs corresponding to a MU-MIMO channel extending between the transmitter and the users in the instant user group. During conventional MCS adaptation, QR decomposition is performed for each evaluated user group. For instance, QR decomposition is performed for each possible user group computation when user selection is based on a brute-force or exhaustive search approach. As a result, the complexity associated with conventional MCS adaptation for MU-MIMO downlink scheduling can approach an order of cubic the number of transmit antenna (e.g., $O(N^3)$ for a system having N transmit antennas).

Aspects of this disclosure reduce the computational complexity of MCS adaptation for MU-MIMO by circumventing QR decomposition during subsequent stages of MCS adaptation. More specifically, an instant upper right triangular matrix ($R_1$) is computed directly from an earlier upper right triangular matrix (R) and an earlier unitary matrix (U), which were obtained during an earlier stage of MCS adaptation. As such, the instant upper right triangular matrix ($R_1$) is obtained without performing QR decomposition on the instant Hermitian matrix ($H_1^H$). Additional aspects of this disclosure circumvent inversion of the instant upper right triangular matrix ($R_1$) to further reduce the computational complexity of MCS adaptation during non-linear MU-MIMO user selection. As discussed herein, calculating MCSs for users in a user group refers to any computation relating to the selection of a coding and modulation scheme for transmissions to users in the user group. For instance, calculating MCSs for a user group may include calculating/predicting Shannon rates for users in the user group based on an upper right triangular matrix (e.g., obtained through QR decomposition or alternative mechanisms described herein), and then mapping the Shannon rates to MCSs for users in the user group. Mapping the Shannon rates to MCSs of users in the user group may be achieved in a variety of ways, some of which are discussed in chapter 9 of Cisco Wireless LAN Configuration Guide (Release 7.0.116.0), which is incorporated herein by reference as if reproduced in its entirety. For instance, table 9-3 in the Cisco Wireless LAN Configuration Guide shows a mapping of required link SNR (last column) to MCS (second column). Other mappings may also be used.

FIG. 1 illustrates a wireless network 100 comprising an eNBs 110 configured to provide wireless access to a plurality of UEs 120-160 in a cellular coverage area (cell) 101. The eNB 110 may be any device configured to provide wireless access, and may be any one of a number of wireless devices including NodeBs, base stations, communications controllers, controllers, femtocells, home base stations, etc. The UEs 120-160 may be any device that allows a user to access the wireless network 100, and may be commonly referred to as mobile stations, subscribers, terminals, users, etc. In some embodiments, the wireless network 100 may include other wireless devices (not shown), including relays, femtocells, picocells, etc. As depicted in FIG. 1, the UEs 110-160 may communicate with the eNB 110 over the wireless links (dashed arrows). In some systems, multi-antenna transmission techniques may be used to communicate over one or more of the wireless links in order to improve wireless performance (e.g., throughput, coverage, etc.) of the wireless network 100. As discussed herein, the terms user, mobile station, terminal, user terminal, subscriber, subscriber device, station, and UE may be used interchangeably. User groups may be selected by a network controller, which may be an eNB or a central controller scheduler.

Figure 2:
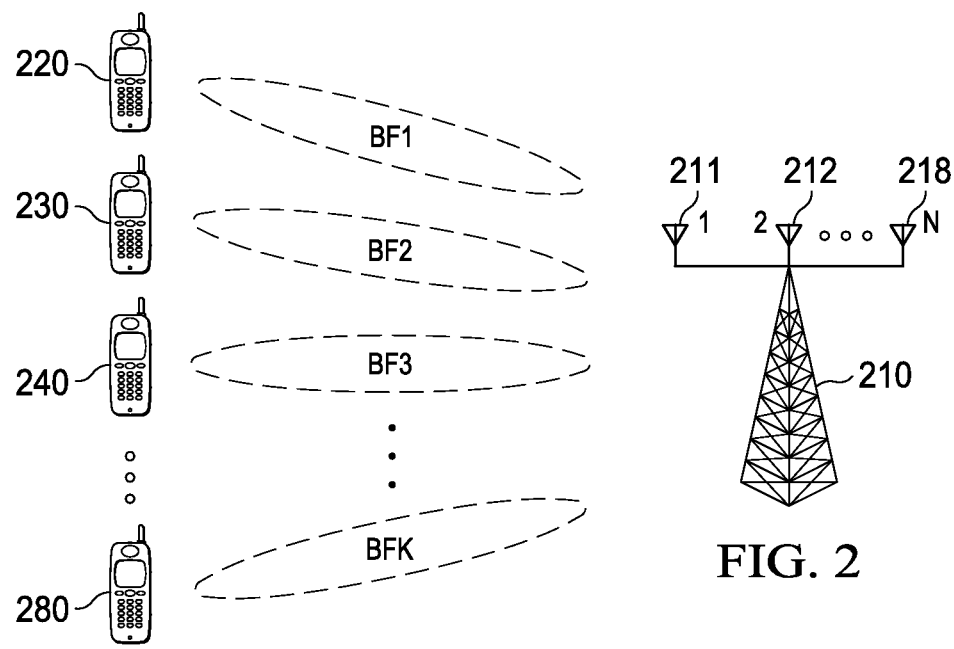
FIG. 2 illustrates a wireless communications network configured for MU-MIMO.

FIG. 2 illustrates a wireless network 200 in which an eNB 210 is configured to perform multi-antenna downlink transmissions to the UEs 220-280. In embodiments, the eNB 210 may perform multi-antenna downlink transmissions in accordance with a linear or non-linear MU-MIMO transmission technique, which may include assigning spatial resources to UEs 220-280. More specifically, the eNB 210 may perform MCS adaptation to determine which group of the UEs 220-280 (referred to herein as a 'user group') should be scheduled for a given time-frequency instance, as well as to determine which precoding weights (e.g., spatial resources) to assign to those users. MCS adaptation may include computing a utility function (also called a sum of utility functions or 'sum utility function' for short) for at least some of the possible user groups/combinations to determine which pairing of users maximizes the utility function (also called a sum of utility functions). The sum utility function may be determined in accordance with various weighted factors, such as coverage, throughput, latency, and others, and may be used a general yardstick for judging the performance of the network within the context of objectives set forth by the network administrator. When an exhaustive search is used, all possible user group combinations are considered. When a non-exhaustive search (e.g., schedule and pair approach, etc.) is used, fewer than all possible user group combinations are considered.

Conventional MCS adaptation performs QR decomposition for each evaluated user group. Aspects of this disclosure provide an alternative to QR decomposition during subsequent stages of MCS adaptation for non-linear MU-MIMO.

Figure 3:
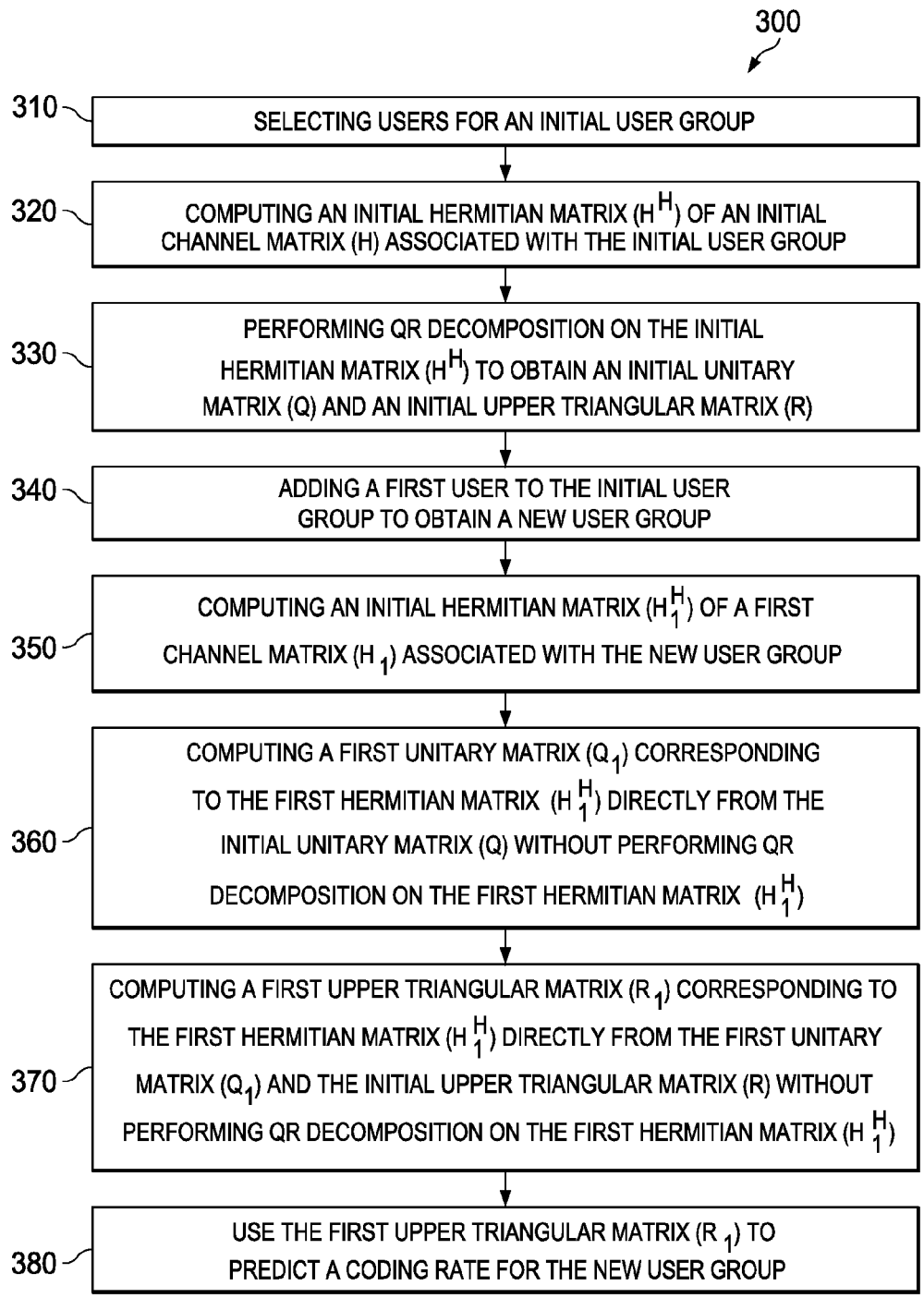
FIG. 3 illustrates a flowchart of an embodiment method for performing MCS adaptation to predict coding rates during non-linear MU-MIMO user selection.

FIG. 3 illustrates a method 300 for performing MCS adaptation to calculate MCSs during non-linear MU-MIMO user selection, as might be performed by a network controller. The method 300 begins at step 310, where the network controller selects users for an initial user group. The method 300 then proceeds to step 320, where the network controller computes an initial Hermitian matrix ($H^H$) of an initial channel matrix (H) associated with the initial user group. Thereafter, the method 300 proceeds to step 330, where the network controller performs QR decomposition on the initial Hermitian matrix ($H^H$) to obtain an initial unitary matrix (Q) and an initial upper triangular matrix (R). Next, the method 300 proceeds to step 340, where the network controller adds a first user to the initial user group to obtain a new user group. Subsequently, the method 300 proceeds to step 350, where the network controller computes an initial Hermitian matrix ($H_1^H$) of a first channel matrix ($H_1$) associated with the new user group.

Next, the method 300 proceeds to step 360, where the network controller computes a first unitary matrix ($Q_1$) corresponding to the first Hermitian matrix ($H_1^H$) directly from the initial unitary matrix (Q). That is to say, the network controller computes the first unitary matrix ($Q_1$) without performing QR decomposition on the first Hermitian matrix ($H_1^H$). More specifically, the network controller computes the last column ($e_1$) of the first unitary matrix ($Q_1$) in accordance with the formula:

$$e_1 = \frac{h_1^H - \sum_{k=1}^{K} proj_{q_k}^{h_1^H}}{\left\| h_1^H - \sum_{k=1}^{K} proj_{q_k}^{h_1^H} \right\|},$$

where $h_1^H$ is a column in the first Hermitian matrix ($H_1^H$) that corresponds to the new user, $proj_{q_k}^{h_1^H}$ is a vector projection of the $h_1^H$ onto a $k^{th}$ column ($q_k$) of the initial unitary matrix (Q), and K is a number of users in the initial user group.

Thereafter, the method 300 proceeds to step 370, where the network controller computes a first upper triangular matrix ($R_1$) corresponding to the first Hermitian matrix ($H_1^H$) directly from the first unitary matrix ($Q_1$) and the initial upper triangular matrix (R). That is to say, the network controller computes the first upper triangular matrix ($R_1$) without performing QR decomposition on the first Hermitian matrix ($H_1^H$). More specifically, the elements of the last column ($r_1$) of the first upper triangular matrix ($R_1$) are computed in accordance with the following formula:

$$[r_1]_k = \begin{cases} \langle q_k, h_1^H \rangle & k = 1, \ldots, K \\ \langle e_1, h_1^H \rangle & k = K+1 \end{cases},$$

where $[r_1]_k$ is a value for a $k^{th}$ element of the last column ($r_1$) of the first upper triangular matrix ($R_1$), and where (K+1) is a number of users in the first new user group.

Finally, the method 300 proceeds to step 380, where the network controller uses the first upper triangular matrix ($R_1$) to calculate MCSs for users in the new user group. More specifically, the MCS for each user in the new user group in accordance with the formula:

$$r_k = \log\left(1 + \frac{r_{kk}^2}{KN_0}\right),$$

where $r_k$ is a calculated rate for a $k^{th}$ user in the first new user group.

Figure 4:
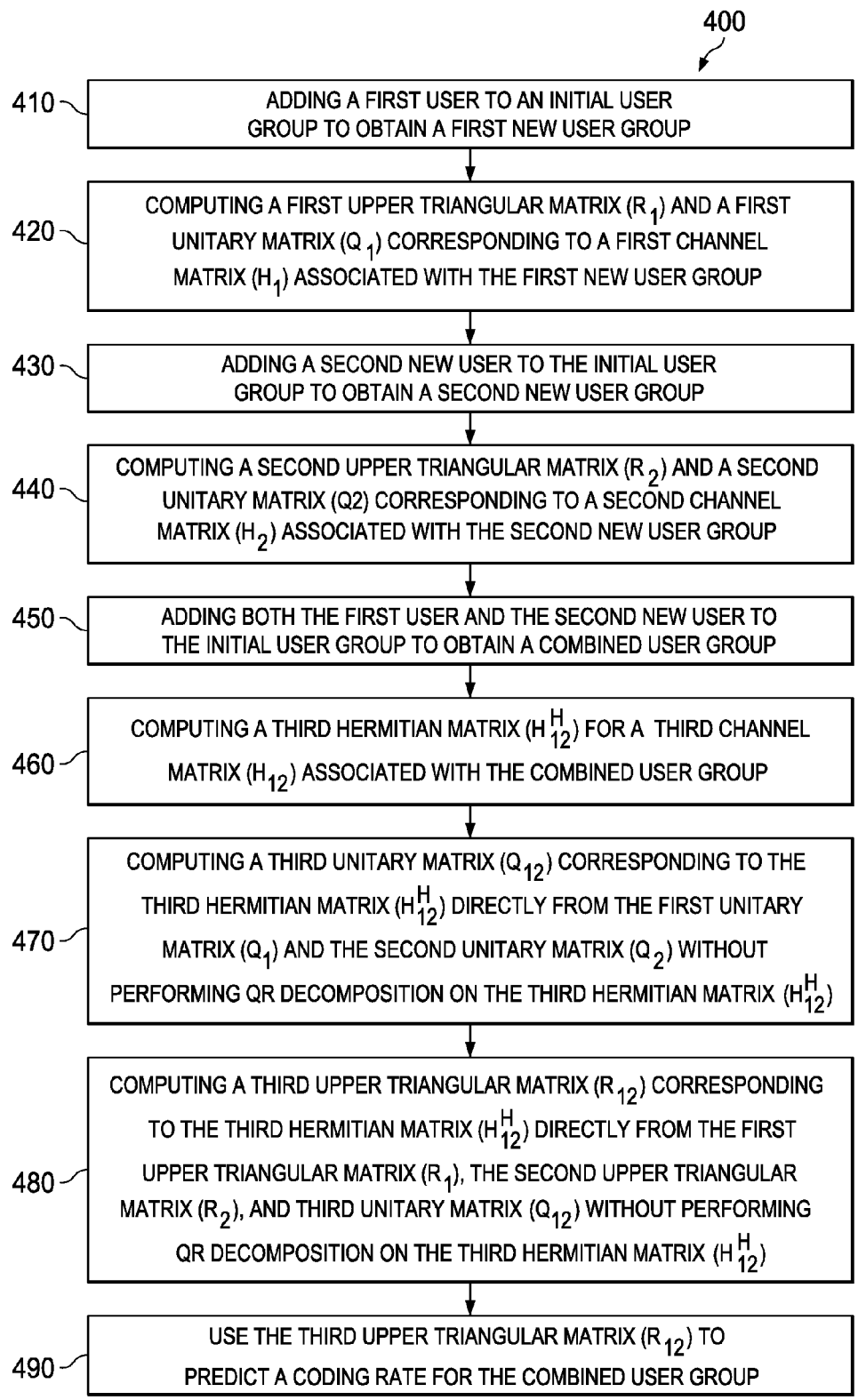
FIG. 4 illustrates a flowchart of another embodiment method for performing MCS adaptation to predict coding rates during non-linear MU-MIMO user selection.

Aspects of this disclosure can also be applied to later stages of MCS adaptation. FIG. 4 illustrates a method 400 for performing MCS adaptation to calculate coding rates during non-linear MU-MIMO user selection, as might be performed by a network controller. The method 400 begins at step 410, where the network controller adds a first new user to an initial user group. Next, the method 400 proceeds to step 420, where the network controller computes a first upper triangular matrix ($R_1$) and a first unitary matrix ($Q_1$) corresponding to a first channel matrix ($H_1$) associated with the first new user group. The first upper triangular matrix ($R_1$) and a first unitary matrix ($Q_1$) may be computed directly from a known upper triangular matrix (R) and a known unitary matrix (Q) corresponding to the initial user group using techniques discussed supra in FIG. 3. Alternatively, the first upper triangular matrix ($R_1$) and a first unitary matrix ($Q_1$) may be computed by performing QR decomposition on a first Hermitian matrix ($H_1^H$) of the first channel matrix ($H_1$).

Thereafter, the method 400 proceeds to step 430, where the network controller adds a second new user to the initial user group to obtain a second new user group. Subsequently, the method 400 proceeds to step 440, where the network controller computes a second upper triangular matrix ($R_2$) and a second unitary matrix (Q2) corresponding to a second channel matrix ($H_2$) associated with the second new user group. The second upper triangular matrix ($R_2$) and the second unitary matrix ($Q_2$) may be computed directly from the known upper triangular matrix (R) and the known unitary matrix (Q) corresponding to the initial user group using techniques discussed supra in FIG. 3. Alternatively, the second upper triangular matrix ($R_2$) and the second unitary matrix ($Q_2$) may be computed by performing QR decomposition on a second Hermitian matrix ($H_2^H$) of the second channel matrix ($H_2$).

Next, the method 400 proceeds to step 450, where the network controller adds both the first user and the second new user to the initial user group to obtain a combined user group. Thereafter, the method 400 proceeds to step 460, where the network controller computes a third Hermitian matrix ($H_{12}^H$) for a third channel matrix ($H_{12}$) associated with the combined user group. Subsequently, the method 400 proceeds to step 470, where the network controller computes a third unitary matrix ($Q_{12}$) corresponding to the third Hermitian matrix ($H_{12}^H$) directly from the first unitary matrix ($Q_1$) and the second unitary matrix ($Q_2$). For example, the network controller computes the third unitary matrix ($Q_{12}$) without performing QR decomposition on the third Hermitian matrix ($H_{12}^H$). More specifically, the third unitary matrix ($Q_{12}$) is expressed as follows: $Q_{12} = [Q_1 \ e_{12}]_{N \times (K+2)}$, where $e_{12}$ is the last column of the third unitary matrix ($Q_{12}$). The last column ($e_{12}$) may be computed in accordance with the formula:

$$e_{12} = \frac{h_2^H - \sum_{k=1}^{K+1} proj_{q_k}^{h_2^H}}{\left\| h_2^H - \sum_{k=1}^{K+1} proj_{q_k}^{h_2^H} \right\|},$$

where $h_2^H$ is a column in the third Hermitian matrix ($H_{12}^H$) that corresponds to the second new user, $\text{proj}_{q_k}^{h_2^H}$ is a vector projection of the $h_2^H$ onto a $k^{th}$ column ($q_k$) of the first unitary matrix ($Q_1$), and K is a number of users in the initial user group.

Next, the method 400 proceeds to step 480, where the network controller computes a third upper triangular matrix ($R_{12}$) corresponding to the third Hermitian matrix ($H_{12}^H$) directly from the first upper triangular matrix ($R_1$), the second upper triangular matrix ($R_2$), and third unitary matrix ($Q_{12}$). That is to say, the third upper triangular matrix ($R_{12}$) is computed without performing QR decomposition on the third Hermitian matrix ($H_{12}^H$). More specifically, the third upper triangular matrix ($R_{12}$) may be expressed as follows:

$$R_{12} = \begin{bmatrix} R_1 & r_{12} \\ 0 \dots 0 & \end{bmatrix}_{(K+2)\times(K+2)},$$

where $r_{12}$ is the last column of the third upper triangular matrix ($R_{12}$). The last column ($r_{12}$) may be computed in accordance with the formula:

$$[r_{12}]_k = \begin{cases} \langle q_k, h_{12}^H \rangle & k = 1, \dots, K \\ \langle e_1, h_{12}^H \rangle & k = K+1 \\ \langle e_{12}, h_{12}^H \rangle & k = K+2 \end{cases},$$

where $[r_{12}]_k$ is a value for a $k^{th}$ element of the last column ($r_{12}$) of the third upper triangular matrix ($R_{12}$), and where (K+1) is a number of users in the first new user group, and where (K+2) is a number of users in the third new user group. Finally, the method 400 proceeds to step 490, where the network controller uses the third upper triangular matrix ($R_{12}$) to calculate MCSs for users in the combined user group.

Figure 5:
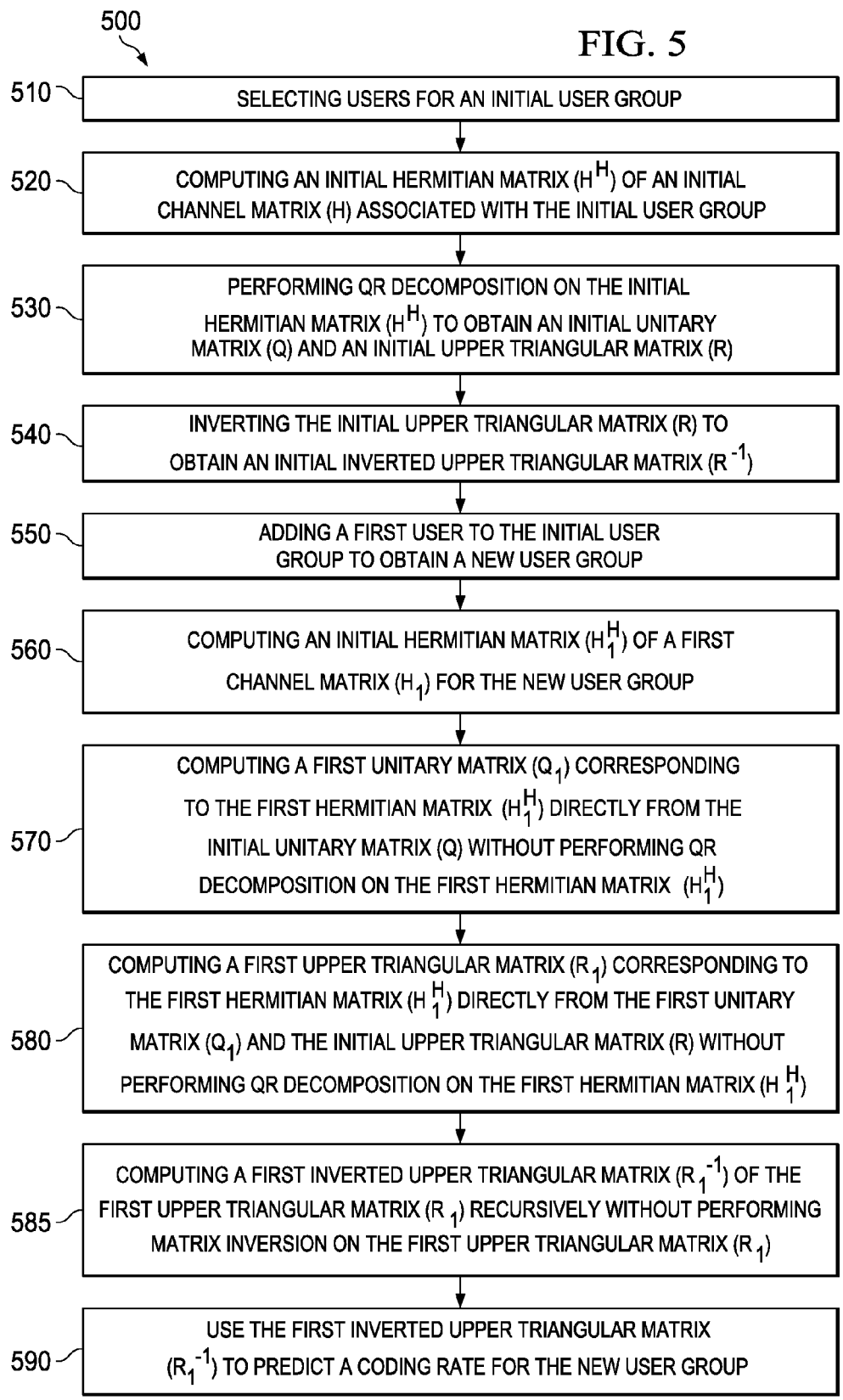
FIG. 5 illustrates an embodiment method for performing MCS adaptation to predict coding rates during linear MU-MIMO user selection.

Aspects of this disclosure also provide an alternative to QR decomposition during subsequent stages of MCS adaptation for linear MU-MIMO. FIG. 5 illustrates a method 500 for performing MCS adaptation to predict coding rates during linear MU-MIMO user selection, as might be performed by a network controller. The method 500 begins at step 510, where the network controller selects users for an initial user group. The method 500 then proceeds to step 520, where the network controller computes an initial Hermitian matrix ($H^H$) of an initial channel matrix (H) associated with the initial user group. Thereafter, the method 500 proceeds to step 530, where the network controller performs QR decomposition on the initial Hermitian matrix ($H^H$) to obtain an initial unitary matrix (Q) and an initial upper triangular matrix (R). Next, the method 500 proceeds to step 540, where the network controller inverts the initial upper triangular matrix (R) to obtain an initial inverted upper triangular matrix ($R^{-1}$). Thereafter, the method 500 proceeds to step 550, where the network controller adds a first user to the initial user group to obtain a new user group. Subsequently, the method 500 proceeds to step 560, where the network controller computes an initial Hermitian matrix ($H_1^H$) of a first channel matrix ($H_1$) associated with the new user group. Thereafter, the method 500 proceeds to steps 570 and 580, where the network controller computes a first unitary matrix ($Q_1$) and a first upper triangular matrix ($R_1$) corresponding to the first Hermitian matrix ($H_1^H$) directly from the initial unitary matrix (Q) and the initial upper triangular matrix (R) in a manner similar to that described in FIG. 3, e.g., without performing QR decomposition on the first Hermitian matrix ($H_1^H$).

Next, the method proceeds to step 585, where the network controller computes a first inverted upper triangular matrix ($R_1^{-1}$) of the first upper triangular matrix ($R_1$) recursively without performing matrix inversion on the first upper triangular matrix ($R_1$). More specifically, the first inverted upper triangular matrix ($R_1^{-1}$) may be expressed as follows:

$$R_1^{-1} = \begin{bmatrix} R^{-1} & s_1 \\ 0 \dots 0 & 1 \end{bmatrix},$$

where $s_1$ is the last column of the first inverted upper triangular matrix ($R_1^{-1}$).

The last column ($s_1$) can be computed in accordance with the following:

$$[s_1]_{K+1} = \frac{1}{[r_1]_{K+1}}, [s_1]_K = \frac{-[r_1]_K}{[R]_{KK}[r]_{K+1}} \text{ and}$$

$$[s_1]_{i-1} = \frac{-1}{[R]_{(i-1)(i-1)}} \left( \sum_{j=1}^{K} [R]_{(i-1)j}[s_1]_j - \frac{[r_1]_{i-1}}{[r_1]_{K+1}} \right),$$

$$i = K, K-1, \dots, 2$$

In embodiments, the above may be consolidated as follows:

$$[s_1]_k = \begin{cases} \frac{-1}{[R]_{(k)(k)}} \left( \sum_{j=k+1}^{K} [R]_{(k)j}[s_1]_j - \frac{[r_1]_k}{[r_1]_{K+1}} \right), & k = 1, \dots, (K-1) \\ \frac{-[r_1]_K}{[R]_{KK}[r_1]_{K+1}}, & k = K \\ \frac{1}{[r_1]_{K+1}}, & k = K+1 \end{cases}$$

Finally, the method 500 proceeds to step 590, where the network controller uses the first inverted upper triangular matrix ($R_1^{-1}$) to compute a scaling factor (c) used for calculating MCSs for users in the new user group. More specifically, the scaling factor (c) is computed in accordance with the following formula:

$$c = \frac{1}{\sqrt{\sum_{k=1}^{K} d_k^2 \times |[R^{-1}]_k|^2}},$$

where $d_k$ is a $k^{th}$ diagonal element of a diagonal matrix (D) representing precoder power allocation, and $[R^{-1}]_k$ is a vector corresponding to a $k^{th}$ row of the first inverted upper triangular matrix ($R_1^{-1}$). After computing the scaling factor (c), the network controller can predict the MCS for each user in the new user group in accordance with the formula:

$$Rate_k = \log\left(1 + \frac{c^2 d_k^2}{N_0}\right),$$

where $Rate_k$ is the Shannon rate for a $k^{th}$ user, and $N_0$ is the noise power.

Figure 6:
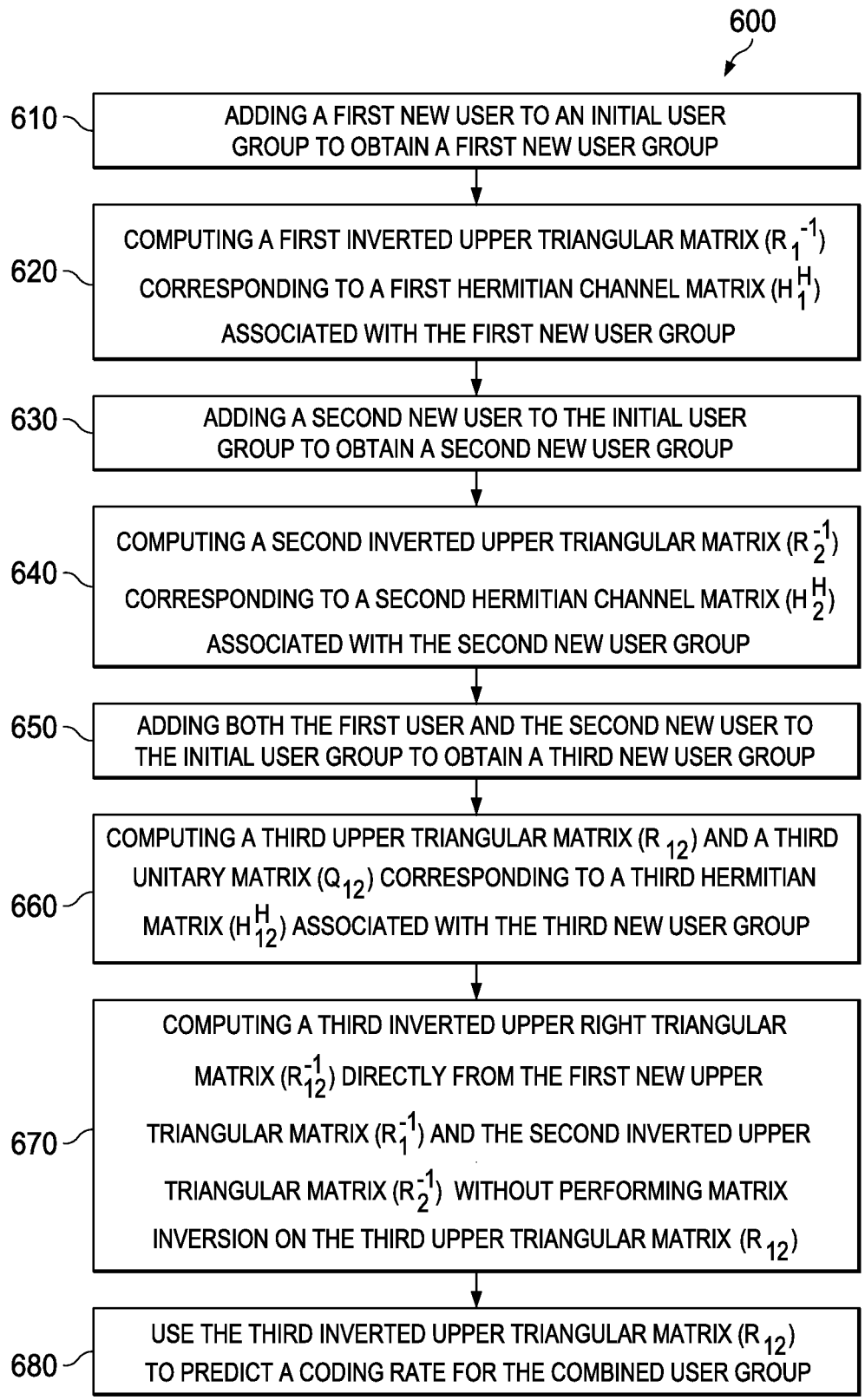
FIG. 6 illustrates another embodiment method for performing MCS adaptation to predict coding rates during linear MU-MIMO user selection.

Aspects related to FIG. 5 can also be applied to later stages of MCS adaptation. FIG. 6 illustrates a method 600 for performing MCS adaptation to predict coding rates during linear MU-MIMO user selection, as might be performed by a network controller. The method 600 begins at step 610, where the network controller adds a first new user to an initial user group. Next, the method 600 proceeds to step 620, where the network controller computes a first inverted upper triangular matrix ($R_1^{-1}$) corresponding to a first Hermitian channel matrix ($H_1^H$) associated with the first new user group. Thereafter, the method 600 proceeds to step 630, where the network controller adds a second new user to the initial user group to obtain a second new user group.

Subsequently, the method 600 proceeds to step 640, where the network controller computes a second inverted upper triangular matrix ($R_2^{-1}$) corresponding to a second Hermitian channel matrix ($H_2^H$) associated with the second new user group. Next, the method 600 proceeds to step 650, where the network controller adds both the first user and the second new user to the initial user group to obtain a combined user group. Thereafter, the method 600 proceeds to step 660, where the network controller computes a third upper triangular matrix ($R_{12}$) and a third unitary matrix ($Q_{12}$) corresponding to the third Hermitian matrix ($H_{12}^H$). Subsequently, the method 600 proceeds to step 670, where the network controller computes a third inverted upper right triangular matrix ($R_2^{-1}$) directly from the first new upper triangular matrix ($R_1^{-1}$) and the second inverted upper triangular matrix ($R_2^{-1}$) without performing matrix inversion on the third upper triangular matrix ($R_{12}$). More specifically, the first new upper triangular matrix ($R_1^{-1}$) can be expressed as $$R_1^{-1} = \begin{bmatrix} R^{-1} & -R^{-1}[r_1]_{1:K}[r_1]_{K+1}^{-1} \\ 00 \dots 0 & [r_1]_{K+1}^{-1} \end{bmatrix},$$

the second new inverted upper triangular matrix ($R_2^{-1}$) can be expressed as $$R_2^{-1} = \begin{bmatrix} R^{-1} & -R^{-1}[r_2]_{1:K}[r_2]_{K+1}^{-1} \\ 00 \dots 0 & [r_2]_{K+1}^{-1} \end{bmatrix},$$

and the third new inverted upper triangular matrix can be expressed as $$R_{12}^{-1} = \begin{bmatrix} R_1^{-1} & -R_1^{-1}\begin{bmatrix} [r_2]_{1:K} \\ \alpha \end{bmatrix}\beta^{-1} \\ 00 \dots 0 & \beta^{-1} \end{bmatrix}.$$

Finally, the method 600 proceeds to step 680, where the network controller uses the third inverted upper triangular matrix ($R_{12}$) to calculate MCSs for users in the new user group.

The following is a brief description of the mathematical steps used to achieve aspects of this disclosure. During conventional MCS adaptation for linear MU-MIMO user selection, a zero-forcing MU-MIMO precoder can be expressed as: $P_{N \times K} = cH^H(HH^H)^{-1}D$ where $D_{K \times K}$ is a diagonal matrix with diagonal elements $d_1, \dots, d_K$ to allow power allocation on the columns of precoder, and c is a scalar to limit the transmit power. The transmit signal is given by: $x_{N \times 1} = P_{N \times K}u_{K \times 1}$, here $u_{K \times 1}$ is the vector of user signals chosen from a unit power constellation. Without loss of generality, the unit transmit power is given as follows:

$tr(PP^H) = c^2 tr(H^H(HH^H)^{-1}D^2(HH^H)^{-1}H)$
$tr(PP^H) = c^2 tr((HH^H)^{-1}D^2)$
$tr(PP^H) = 1$

Accordingly, the scaling factor is then given by:

$$c = \frac{1}{\sqrt{tr((HH^H)^{-1}D^2)}},$$

and the received signal at user k is given by $y_k$ $cd_k u_k + z_k$, $k = 1, \dots, K$. In order to calculate the rate of users, (e.g., MCS adaptation for users) from the received signal equation, the scaling factor c is calculated. For instance, if a Shannon rate is used for MCS adaptation, the rate of user k will be given by:

$$r_k = \log\left(1 + \frac{c^2 d_k^2}{N_0}\right).$$

Because matrix pseudo-inverse calculation is used to calculate the scaling factor c, the computational complexity of rate calculation (MCS adaptation for users) is on the order of the number of transmit antennas cubed (e.g., complexity is $O(N^3)$).

During conventional MCS adaptation for non-linear MU-MIMO user selection, a MU-MIMO channel matrix by ($H_{K \times N}$) of the MU-MIMO channel extending between the transmitter (having K transmit antennas) and a user group (having N users) is obtained through channel estimation. Next, a Hermitian matrix ($H^H$) is obtained by taking the conjugate transpose of the MU-MIMO channel matrix. Thereafter, QR decomposition of the Hermitian matrix ($H^H$) is performed to obtain the upper-right triangular matrix ($R_{K+K}$) in accordance with the following formula: $H^H = Q_{N \times K}R_{K \times K}$, where $Q_{N \times K}$ is the unitary matrix of the Hermitian matrix ($H^H$). The unitary matrix ($Q_{N \times K}$) has orthonormal columns and the upper-right Triangular matrix ($R_{K+K}$) has diagonal element ($r_{kk}$) having real, non-zero, values.

The orthogonal columns of ($Q_{N \times K}$) may be expressed in vectors ($u_{ii}$), with $u_{K \times 1}$, representing the vector of user signals chosen from a unit power constellation. A nonlinear operation is applied to $u_{K \times 1}$, to obtain a nonlinearly precoded vector $v_{K \times 1}$. Hence, the transmitted signal ($x_{N \times 1}$) is given by $x_{N \times 1} = Q_{N \times K}v_{K \times 1}$. The received vector ($Y_{K+1}$) containing the received signal of users is given by:

$$y_{K \times 1} = Hx + z$$
$$= R^H Q^H Qv + z$$
$$= R^H v + z,$$

where z is circularly symmetric Gaussian noise vector with covariance matrix $R_z = N_0 I$.

Accordingly, the original MU-MIMO channel turns into L interference sub-channels:

$$y_k = r_{kk}v_k + \sum_{j<k} r_{jk}^* v_j + z_k, \quad k = 1, \dots, K, \text{ where } r_{jk} = [R]_{jk}.$$

Hence, user k experiences interference only from users j<k. Dirty paper coding (DPC) can be applied on each sub-channels in (1) to cancel the interference on users. With DPC, the calculated rate of user k is given by $$r_k = \log\left(1 + \frac{r_{kk}^2}{KN_0}\right).$$

However, DPC may be too complex for practical implementation. A lower complexity alternative to DPC may be zero forcing Tomlinson-Harashima precoding (ZF-THP), which includes the nonlinear step:

$$v_1 = u_1$$
$$v_2 = u_2 - \frac{r_{12}^*}{r_{22}}v_1 + \tau l_2$$
$$\vdots$$
$$v_K = u_K - \frac{r_{(K-1)K}^*}{r_{KK}}v_{K-1} - \ldots - \frac{r_{1K}^*}{r_{KK}}v_1 + \tau l_K,$$

where $l_2, \ldots, l_K$ are complex integers chosen such that elements of the nonlinearly precoded vector v remain within the original constellation boundaries.

Regardless of which conventional approach is relied upon (e.g., DPC, ZF-THP, etc.), the diagonal element of R should be known in order to calculate the MCS for users in the user group.

Assume K users are selected for DL MU-MIMO transmission using ZF-THP. Denote the corresponding MU-MIMO channel matrix by $H_{K \times N}$. Let the QR decomposition of $H^H$ be given by $H^H = Q_{N \times K} R_{K \times K}$, where Q has orthonormal columns and R is an upper triangular matrix with real entries on the diagonals. Let $u_{K \times 1}$ be the vector of user signals chosen from a unit power constellation. A nonlinear operation (to be described later) is applied to $u_{K \times 1}$ to obtain a nonlinearly precoded vector $v_{K \times 1}$. The transmitted signal is given by $x_{N \times 1} = Q_{N \times K} v_{K \times 1}$, and the received vector containing the received signal of users is given by $$y_{K \times 1} = Hx + z$$
$$= R^H Q^H Q v + z$$
$$= R^H v + z,$$

where z is circularly symmetric Gaussian noise vector with covariance matrix $R_z = N_0 I$. So the original MU-MIMO channel turns into L interference sub-channels given by $$y_k = r_{kk}v_k + \sum_{j<k} r_{jk}^* v_j + z_k, \quad k = 1, \ldots, K, \text{ where } r_{jk} = [R]_{jk}.$$

From this, user k experiences interference only from users j<k. Dirty paper coding (DPC) can be applied on each sub-channels to cancel the interference on users. This approach is described in Beal, M. J., Variational algorithms for approximate Bayesian inference, PhD thesis, Gatsby Computational Neuroscience Unit, University College London, 2003, which is incorporated by reference herein as if reproduced in its entirety. With DPC, the calculated rate of user k is given by $$r_k = \log\left(1 + \frac{r_{kk}^2}{KN_0}\right).$$

DPC may be too complex for implementation. Tomlinson-Harashima precoding (THP) may be a lower complexity approach for interference cancellation. The nonlinear step of ZF-THP is given by:

$$v_1 = u_1$$
$$v_2 = u_2 - \frac{r_{12}^*}{r_{22}}v_1 + \tau l_2$$
$$\vdots$$
$$v_K = u_K - \frac{r_{(K-1)K}^*}{r_{KK}}v_{K-1} - \ldots - \frac{r_{1K}^*}{r_{KK}}v_1 + \tau l_K,$$

where $l_2, \ldots, l_K$ are complex integers chosen such that elements of the nonlinearly precoded vector v remain within the original constellation boundaries.

According to this, in order to calculate the calculated rate of users, the diagonal elements of R is calculated. The complexity of this calculation is $O(N^3)$.

The following is a brief description of the mathematical steps used to achieve aspects of this disclosure as described in FIG. 3. Let $H^H = Q_{N \times K} R_{K \times K}$. Denote the augmented H by $H_1$ defined as $$H_1 = \begin{bmatrix} H \\ h_1 \end{bmatrix}_{(K+1) \times N}.$$

Also, denote the corresponding unitary and upper triangular matrices resulted from QR decomposition of $H_1^H$ by $Q_1$ and $R_1$, respectively. We note the following:

$$Q_1 = [Q \ e_1]_{N \times (K+1)} \text{ and } R_1 = \begin{bmatrix} R & r_1 \\ 0 \ldots 0 & 0 \end{bmatrix}_{(K+1) \times (K+1)}.$$

Therefore, only the last columns of $R_1$ and $Q_1$ need to be calculated. This can be done by projecting the last row of the augmented channel to columns of Q denoted by $q_1, \ldots, q_K$ as follows in the next equations.

$$w_1 = h_1^H - \text{proj}_{q_1}^{h_1^H} - \ldots - \text{proj}_{q_K}^{h_1^H},$$
$$\text{where } \text{proj}_b^a = \frac{\langle b, a \rangle}{\langle b, b \rangle} b \text{ and } \langle a, b \rangle = a^H b,$$

The last column of $Q_1$ is then given by $$e_1 = \frac{w_1}{\|w_1\|}$$

and the elements of column $r_1$ are given by $$[r_1]_k = \begin{cases} \langle q_k, h_1^H \rangle & k = 1, \ldots, K \\ \langle e_1, h_1^H \rangle & k = K+1 \end{cases}.$$

Accordingly the computational complexity of QR decomposition of the augmented channel is reduced from $O(N^3)$ to $O(N^2)$.

The following is a brief description of the mathematical steps used to achieve aspects of this disclosure as described in FIG. 4. Let $H^H = Q_{N \times K} R_{K \times K}$ and $H_1$ and $H_2$ be the augmented matrices defined as $$H_1 = \begin{bmatrix} H \\ h_1 \end{bmatrix}_{(K+1) \times N} \text{ and } H_2 = \begin{bmatrix} H \\ h_2 \end{bmatrix}_{(K+1) \times N}$$

with QR decompositions $H_1^H = Q_1 R_1$ and $H_2^H = Q_2 R_2$. A low complexity method to calculate the QR decomposition of $$H_{12} = \begin{bmatrix} H \\ h_1 \\ h_2 \end{bmatrix}.$$

Let the QR decomposition of $H_{12}^H$ be given by $H_{12}^H = Q_{12} R_{12}$. Accordingly, $$Q_{12} = [Q_1 \ e_{12}]_{N \times (K+2)} \text{ and } R_{12} = \begin{bmatrix} R_1 & r_{12} \\ 0 \ldots 0 & \end{bmatrix}_{(K+2) \times (K+2)}$$

are obtained. In order to calculate $e_{12}$ and $r_{12}$, previous calculations for both $H_1$ and $H_2$ are exploited. The steps for calculating $e_{12}$ and $r_{12}$ are as follows.

$$w_{12} = \frac{h_2^H - \text{proj}_{q_1}^{h_2^H} - \ldots - \text{proj}_{q_K}^{h_2^H} - \text{proj}_{e_1}^{h_2^H}}{w_2} \text{ and } e_{12} = \frac{w_{12}}{\|w_{12}\|}.$$

Moreover $w_2$ has been calculated in the QR decomposition of $H_2^H$ so only one projection is needed and extra calculations can be avoided. The elements of column $r_{12}$ are given by $$[r_{12}]_k = \begin{cases} \langle q_k, h_2^H \rangle & k = 1, \ldots, K \\ \langle e_1, h_2^H \rangle & k = K+1 \\ \langle e_{12}, h_2^H \rangle & k = K+2 \end{cases}.$$

Further, the first K elements of $w_2$ have been calculated in the QR decomposition of $H_2^H$ and only two inner products needs to be calculated. This reduces the computational complexity from $O(N^3)$ to $O(N)$.

The following is a brief description of the mathematical steps used to achieve aspects of this disclosure as described in FIG. 5. Let $H^H = Q_{N \times K} R_{K \times K}$, then $(HH^H)^{-1} = R^{-1} R^{-H}$. Therefore, we have $$tr(PP^H) = c^2 tr(R^{-1} R^{-H} D^2)$$
$$= c^2 \sum_{k=1}^{K} d_k^2 \times |[R^{-1}]_{kth\ row}|^2,$$

from which $$c = \frac{1}{\sqrt{\sum_{k=1}^{K} d_k^2 \times |[R^{-1}]_{kth\ row}|^2}}$$

is derived. The augmented H by $H_1$ defined above, as are the unitary and upper triangular matrices resulted from QR decomposition of $H_1^H$ by $Q_1$ and $R_1$, respectively. It can be shown that $R_1^{-1}$ has the following form $$R_1^{-1} = \begin{bmatrix} R^{-1} & s \\ 0 \ldots 0 & \end{bmatrix}$$

where the elements of column s should satisfy the following set of linear equations which are obtained from $R_1^{-1} R_1 = I$ and $$r_{K+1} s_{K+1} = 1$$
$$\sum_{j=k}^{K} [R]_{kj} s_j + r_k s_{K+1} = 0 \ k = 1, 2, \ldots K.$$

From the above equations, we obtain $$s_{K+1} = \frac{1}{r_{K+1}} \text{ and }$$
$$s_K = \frac{-r_K}{[R]_{KK} r_{K+1}}.$$

Suppose $s_K, s_{K-1}, \ldots, s_i$ are known. The rest of the elements are obtained by successively using the following recurrence equation $$s_{i-1} = \frac{-1}{[R]_{(i-1)(i-1)}} \left( \sum_{j=1}^{K} [R]_{(i-1)j} s_j - \frac{r_{i-1}}{r_{K+1}} \right).$$

Once $R_1^{-1}$ is calculated, the updated scaling factor is obtained from R replaced by $R_1$. The computational complexity using is quadratic with N, thereby reducing the complexity from $O(N^3)$ to $O(N^2)$.

The following is a brief description of the mathematical steps used to achieve aspects of this disclosure as described in FIG. 6. Let $H^H = Q_{N \times K} R_{K \times K}$ and let $H_1, H_2, H_{12}$ and their corresponding QR decompositions are given above. As explained before, we have $$R_1 = \begin{bmatrix} R & r_1 \\ 0 \ldots 0 & \end{bmatrix}_{(K+1) \times (K+1)} \text{ and } R_2 = \begin{bmatrix} R & r_2 \\ 0 \ldots 0 & \end{bmatrix}_{(K+1) \times (K+1)}.$$

The first K elements of $r_{12}$ and $r_1$ are the same. So, we have $$r_{12} = \begin{bmatrix} [r_2]_{1:K} \\ \alpha \\ \beta \end{bmatrix}.$$

Thereafter, the following matrix identity is used for inverting a partitioned matrix:

$$\begin{bmatrix} A_{11} & A_{12} \\ A_{21} & A_{22} \end{bmatrix}^{-1} = \begin{bmatrix} F_{11}^{-1} & -F_{11}^{-1}A_{12}A_{22}^{-1} \\ -A_{22}^{-1}A_{21}F_{11}^{-1} & F_{22}^{-1} \end{bmatrix}.$$

Applying the above identity to the above partitioned matrices, $R_1^{-1}$ and $R_2^{-1}$ can be expressed in terms of $R_1$ and $R_2$ as $$R_1^{-1} = \begin{bmatrix} R^{-1} & -R^{-1}[r_1]_{1:K}[r_1]_{K+1}^{-1} \\ 00\ldots 0 & [r_1]_{K+1}^{-1} \end{bmatrix} \text{ and }$$

$$R_2^{-1} = \begin{bmatrix} R^{-1} & -R^{-1}[r_2]_{1:K}[r_2]_{K+1}^{-1} \\ 00\ldots 0 & [r_2]_{K+1}^{-1} \end{bmatrix}.$$

Additionally, $R_{12}^{-1}$ is expressed as $$R_{12}^{-1} = \begin{bmatrix} R_1^{-1} & -R_1^{-1}\begin{bmatrix} [r_2]_{1:K} \\ \alpha \end{bmatrix}\beta^{-1} \\ 00\ldots 0 & \beta^{-1} \end{bmatrix}.$$

Hence, only $$R_1^{-1}\begin{bmatrix} [r_2]_{1:K} \\ \alpha \end{bmatrix}$$

needs to be calculated. We have $$R_1^{-1}\begin{bmatrix} [r_2]_{1:K} \\ \alpha \end{bmatrix} = \begin{bmatrix} R^{-1} & -R^{-1}[r_1]_{1:K}[r_1]_{K+}^{-1} \\ 00\ldots 0 & [r_1]_{K+}^{-1} \end{bmatrix}\begin{bmatrix} [r_2]_{1:K} \\ \alpha \end{bmatrix}$$

$$= \begin{bmatrix} R^{-1}[r_2]_{1:K} - \alpha R^{-1}[r_1]_{1:K}[r_1]_{K+1}^{-1} \\ \alpha[r_1]_{K+1}^{-1} \end{bmatrix}$$

and $R^{-1}[r_1]_{1:K}$ and $R^{-1}[r_2]_{1:K}$ have already been computed. Therefore, $$R_1^{-1}\begin{bmatrix} [r_2]_{1:K} \\ \alpha \end{bmatrix}$$

can be calculated with linear complexity.

Figure 7:
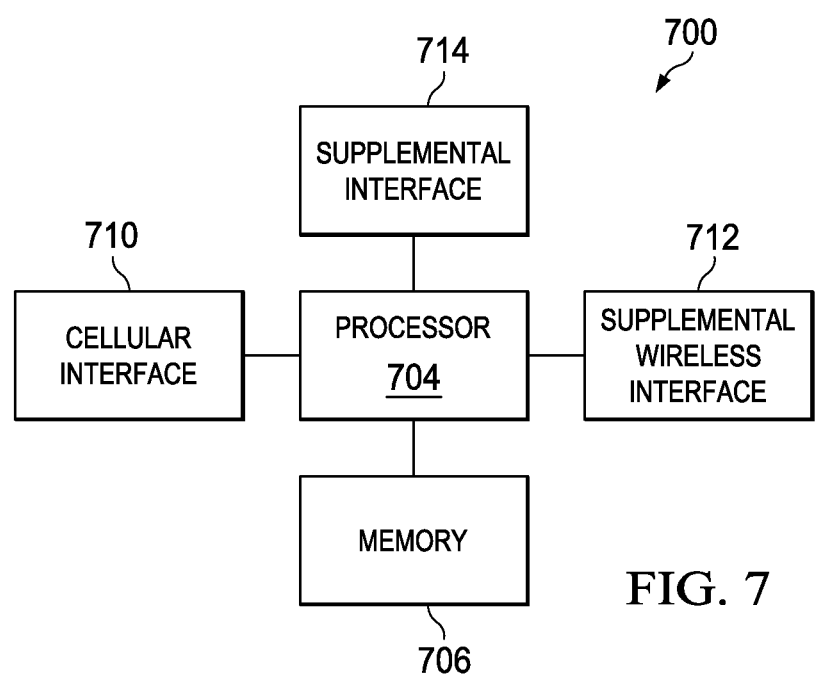
FIG. 7 illustrates a high-level block diagram of a communications device.

FIG. 7 illustrates a block diagram of an embodiment of a communications device 700, which may be equivalent to one or more devices (e.g., UEs, NBs, etc.) discussed above. The communications device 700 may include a processor 704, a memory 706, a cellular interface 710, a supplemental wireless interface 712, and a supplemental interface 714, which may (or may not) be arranged as shown in FIG. 7. The processor 704 may be any component capable of performing computations and/or other processing related tasks, and the memory 706 may be any component capable of storing programming and/or instructions for the processor 704. The cellular interface 710 may be any component or collection of components that allows the communications device 700 to communicate using a cellular signal, and may be used to receive and/or transmit information over a cellular connection of a cellular network. The supplemental wireless interface 712 may be any component or collection of components that allows the communications device 700 to communicate via a non-cellular wireless protocol, such as a Wi-Fi or Bluetooth protocol, or a control protocol. The device 700 may use the cellular interface 710 and/or the supplemental wireless interface 712 to communicate with any wirelessly enabled component, e.g., a base station, relay, mobile device, etc. The supplemental interface 714 may be any component or collection of components that allows the communications device 700 to communicate via a supplemental protocol, including wire-line protocols. In embodiments, the supplemental interface 714 may allow the communications device 700 to communicate with another component, such as a backhaul network component.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method for efficiently assigning transmission parameters in a wireless communications network, the method comprising:
   selecting users for an initial user group in the wireless communications network;
   computing initial modulation coding schemes (MCSs) for users in the initial user group in the wireless communications network, wherein computing the initial MCSs for the users in the initial user group includes performing an initial QR decomposition operation for the initial user group;
   adding a new user to the initial user group to obtain a new user group in the wireless communications network;
   computing a new MCS for the new user in the new user group, wherein computing the new MCS for the new user includes calculating the new MCS directly using information obtained from the initial QR decomposition operation and without performing a QR decomposition operation for the new user group; and
   communicating the new MCS to a transmitter.

2. The method of claim 1, wherein performing the initial QR decomposition operation for the initial user group comprises performing QR decomposition on an initial Hermitian matrix ($H^H$) associated with the initial user group to obtain an initial unitary matrix (Q) and an initial upper triangular matrix (R), and
   wherein calculating the new MCS comprises computing a last column ($r_1$) of a new upper triangular matrix ($R_1$) corresponding to the new user group directly from the initial unitary matrix (Q) and the initial upper triangular matrix (R).

3. An apparatus comprising:
a processor; and
a computer readable storage medium storing programming for execution by the processor, the programming adapted to efficiently assign transmission parameters in a wireless communications network, and including instructions to:
select users for an initial user group in the wireless communications network;
compute initial modulation coding schemes (MCSs) for users in the initial user group, wherein the instruction to compute the initial MCSs for the users in the initial user group includes instructions to perform an initial QR decomposition operation for the initial user group;
add a new user to the initial user group to obtain a new user group in the wireless communications network;
compute a new MCS for the new user in the new user group, wherein the instruction to compute the new MCS for the new user includes instructions to calculate the new MCS directly using information obtained from the initial QR decomposition operation and without performing a QR decomposition operation for the new user group; and
communicate the new MCS to a transmitter in the wireless communications network.

4. The apparatus of claim 3, wherein the instruction to perform the initial QR decomposition operation for the initial user group includes instructions to perform QR decomposition on an initial Hermitian matrix ($H^H$) associated with the initial user group to obtain an initial unitary matrix (Q) and an initial upper triangular matrix (R), and
wherein the instruction to calculate the new MCS includes instructions to compute a last column ($r_1$) of a new upper triangular matrix ($R_1$) corresponding to the new user group directly from the initial unitary matrix (Q) and the initial upper triangular matrix (R).

5. A method for efficiently assigning transmission parameters in a wireless communications network, the method comprising:
selecting users for an initial user group in the wireless communications network;
performing QR decomposition on an initial Hermitian matrix ($H^H$) associated with the initial user group to obtain an initial unitary matrix (Q) and an initial upper triangular matrix (R);
adding a new user to the initial user group to obtain a new user group in the wireless communications network, the new user group associated with a new Hermitian matrix ($H_1^H$);
performing modulation coding scheme (MCS) adaptation for the new user group, wherein performing MCS adaptation for the new user group includes: computing a last column ($r_1$) of a new upper triangular matrix ($R_1$) corresponding to the new Hermitian matrix ($H_1^H$) directly from at least the initial unitary matrix (Q) and the initial upper triangular matrix (R), thereby obtaining the new upper triangular matrix ($R_1$) without performing QR decomposition on the new Hermitian matrix ($H_1^H$); and
calculating MCSs for users in the new user group in accordance with the new upper triangular matrix ($R_1$); and
communicating the MCSs to at least one transmitter in the wireless communications network.

6. The method of claim 5, wherein computing the last column ($r_1$) of the new upper triangular matrix ($R_1$) comprises:

computing a last column ($e_1$) of a new unitary matrix ($Q_1$) corresponding to the new Hermitian matrix ($H_1^H$) directly from the initial unitary matrix (Q) without performing QR decomposition on the new Hermitian matrix ($H_1^H$); and
computing the last column ($r_1$) of the new upper triangular matrix ($R_1$) in accordance with the last column ($e_1$) of the new unitary matrix ($Q_1$).

7. The method of claim 6, wherein computing the last column ($e_1$) of the new unitary matrix ($Q_1$) comprises:
computing the last column ($e_1$) of the new unitary matrix ($Q_1$) in accordance with the formula:

$$e_1 = \frac{h_1^H - \sum_{k=1}^{K} proj_{q_k}^{h_1^H}}{\left\| h_1^H - \sum_{k=1}^{K} proj_{q_k}^{h_1^H} \right\|},$$

where $h_1^H$ is a column in the new Hermitian matrix ($H_1^H$) corresponding to the new user, $proj_{q_k}^{h_1^H}$ is a vector projection of the $h_1^H$ onto a $k^{th}$ column ($q_k$) of the initial unitary matrix (Q), and K is a number of users in the initial user group.

8. The method of claim 7, wherein computing the last column ($r_1$) of the new upper triangular matrix ($R_1$) comprises:
computing elements of the last column ($r_1$) of the new upper triangular matrix ($R_1$) in accordance with the following formula:

$$[r_1]_k = \begin{cases} <q_k, h_1^H> & k = 1, \ldots, K \\ <e_1, h_1^H> & k = K+1, \end{cases}$$

where $[r_1]_k$ is a value for a $k^{th}$ element of the last column ($r_1$) of the new upper triangular matrix ($R_1$), and where (K+1) is a number of users in the new user group.

9. The method of claim 8, wherein calculating the MCSs for users in the new user group comprises:
calculating Shannon rates for users in the new user group in accordance with the formula:

$$r_k = \log\left(1 + \frac{r_{kk}^2}{KN_0}\right),$$

where $r_k$ is a Shannon rate for a $k^{th}$ user in the new user group, and $N_0$ is a noise power; and
obtaining the MCSs for users in the new user group in accordance with a mapping relationship with the Shannon rates for users in the new user group.

10. An apparatus comprising:
a processor; and
a computer readable storage medium storing programming for execution by the processor, the programming adapted to efficiently assign transmission parameters in a wireless communications network, and including instructions to:
select users for an initial user group in the wireless communications network;
perform QR decomposition on an initial Hermitian matrix ($H^H$) associated with the initial user group to obtain an initial unitary matrix (Q) and an initial upper triangular matrix (R);

add a new user to the initial user group to obtain a new user group in the wireless communications network, the new user group associated with a new Hermitian matrix ($H_1^H$);

perform modulation coding scheme (MCS) adaptation for the new user group, wherein the instructions to perform MCS adaptation for the new user group includes instructions to compute a last column ($r_1$) of a new upper triangular matrix ($R_1$) corresponding to the new Hermitian matrix ($H_1^H$) directly from at least the initial unitary matrix (Q) and the initial upper triangular matrix (R), thereby obtaining the new upper triangular matrix ($R_1$) without performing QR decomposition on the new Hermitian matrix ($H_1^H$), and to predict MCSs for users in the new user group in accordance with the new upper triangular matrix ($R_1$); and communicate the MCSs to at least one transmitter in the wireless communications network.

11. A method for efficiently assigning transmission parameters in a wireless communications network, the method comprising:

adding a first new user to an initial user group to obtain a first new user group in the wireless communications network, the first new user group associated with a first new Hermitian matrix ($H_1^H$);

computing a first new unitary matrix ($Q_1$) and a first new upper triangular matrix ($R_1$) corresponding to the first new Hermitian matrix ($H_1^H$);

adding a second new user to the initial user group to obtain a second new user group in the wireless communications network, the second new user group associated with a second new channel matrix ($H_2$);

computing a second new unitary matrix ($Q_2$) and a second new upper triangular matrix ($R_2$) corresponding to the second new Hermitian matrix ($H_2^H$);

adding both the first new user and the second new user to the initial user group to obtain a third new user group in the wireless communications network, the third new user group associated with a third new channel matrix ($H_{12}$);

performing modulation coding scheme (MCS) adaptation for the third new user group, wherein performing MCS adaptation for the third new user group includes:

computing a last column ($r_{12}$) of a third new upper triangular matrix ($R_{12}$) corresponding to the third new channel matrix ($H_{12}$) directly from at least the first new unitary matrix ($Q_1$), the first new upper triangular matrix ($R_1$), the second new unitary matrix ($Q_2$), and the second new upper triangular matrix ($R_2$), thereby obtaining the third new upper triangular matrix ($R_{12}$) without performing QR decomposition on the third new Hermitian matrix ($H_{12}^H$); and predicting MCSs for users in the new user group in accordance with the third new upper triangular matrix ($R_{12}$); and communicating the MCSs to at least one transmitter in the wireless communications network.

12. The method of claim 11, wherein computing the last column ($r_{12}$) of the third new upper triangular matrix ($R_{12}$) comprises:

computing a last column ($e_{12}$) of a third new unitary matrix ($Q_{12}$) corresponding to the third new Hermitian matrix ($H_{12}^H$) directly from the first new unitary matrix ($Q_1$) and the second new unitary matrix ($Q_2$) without performing QR decomposition on the third new Hermitian matrix ($H_{12}^H$); and computing the last column ($r_{12}$) of the third new upper triangular matrix ($R_{12}$) in accordance with the last column ($e_{12}$) of the new unitary matrix ($Q_{12}$).

13. The method of claim 11, wherein computing the last column ($e_{12}$) of the third new unitary matrix ($Q_{12}$) comprises:

computing the last column (e12) of the third new unitary matrix (Q12) in accordance with the formula:

$$e_{12} = \frac{h_2^H - \sum_{k=1}^{K+1} proj_{q_k}^{h_2^H}}{\left\| h_2^H - \sum_{k=1}^{K+1} proj_{q_k}^{h_2^H} \right\|},$$

where $h_2^H$ is a column in the third Hermitian matrix ($H_{12}^H$) corresponding to the second new user, $proj_{q_k}^{h_2^H}$ is a vector projection of the $h_2^H$ onto a $k^{th}$ column ($q_k$) of the first unitary matrix ($Q_1$), and K is a number of users in the initial user group.

14. The method of claim 13, wherein computing the last column ($r_{12}$) of the third new upper triangular matrix ($R_{12}$) comprises:

computing a last column ($r_{12}$) of the third new upper triangular matrix ($R_{12}$) in accordance with the following formula:

$$[r_{12}]_k = \begin{cases} <q_k, h_{12}^H> & k = 1, \ldots, K \\ <e_1, h_{12}^H> & k = K+1 \\ <e_{12}, h_{12}^H> & k = K+2, \end{cases}$$

where $[r_{12}]_k$ is a value for a $k^{th}$ element of the last column ($r_{12}$) of the third upper triangular matrix ($R_{12}$), $h_2^H$ is a diagonal element of the third new Hermitian matrix ($H_{12}^H$), (K+1) is a number of users in the first new user group, and (K+2) is a number of users in the third new user group.

15. The method of claim 14, wherein predicting the MCS for users in the third new user group comprises:

computing a predicted rate for each user in the third new user group in accordance with the formula:

$$r_k = \log\left(1 + \frac{r_{kk}^2}{KN_0}\right),$$

where $r_k$ is a predicted rate for a $k^{th}$ user in the new user group, and $N_0$ is a noise power.

16. A method for efficiently assigning transmission parameters in a wireless communications network, the method comprising:

selecting users for an initial user group in the wireless communications network, wherein an initial channel matrix (H) corresponds to the initial user group and a transmitter;

performing QR decomposition on an initial Hermitian matrix ($H^H$) associated with the initial user group to obtain an initial unitary matrix (Q) and an initial upper triangular matrix (R);

inverting the upper triangular matrix (R) to obtain an initial inverted upper triangular matrix ($R^{-1}$);

adding a new user to the initial user group to obtain a new user group in the wireless communications network, the new user group associated with a new Hermitian matrix ($H_1^H$);

performing modulation coding scheme (MCS) adaptation for the new user group, wherein performing MCS adaptation for the new user group includes: computing a new unitary matrix ($Q_1$) and a new upper triangular matrix ($R_1$) corresponding to the new Hermitian matrix ($H_1^H$); computing a last column ($s_1$) of a new inverted upper triangular matrix ($R_1^{-1}$) corresponding to the new upper triangular matrix ($R_1$) directly from at least the new unitary matrix ($Q_1$) and a last column ($r_1$) of the new upper triangular matrix ($R_1$), thereby obtaining the new inverted upper triangular matrix ($R_1^{-1}$) without performing matrix inversion on the new upper triangular matrix ($R_1$); and predicting MCSs for users in the new user group in accordance with the new inverted upper triangular matrix ($R_1^{-1}$); and communicating the MCSs to at least one transmitter in the wireless communications network.

17. The method of claim 16, wherein computing the last column ($s_1$) of a new inverted upper triangular matrix ($R_1^{-1}$) corresponding to the new upper triangular matrix ($R_1$) comprises:

computing the last column ($s_1$) of the new inverted upper triangular matrix ($R_1^{-1}$) in accordance with the formula:

$$[s_1]_k = \begin{cases} \frac{-1}{[R]_{(k)(k)}}\left(\sum_{j=k+1}^{K}[R]_{(k)j}[s_1]_j - \frac{[r_1]_k}{[r_1]_{K+1}}\right), & k=1,\ldots,(K-1) \\ \frac{-[r_1]_K}{[R]_{KK}[r_1]_{K+1}}, & k=K \\ \frac{1}{[r_1]_{K+1}}, & k=K+1, \end{cases}$$

where $[s_1]_k$ is a value for a $k^{th}$ element of the last column ($s_1$) of the new inverted upper triangular matrix ($R_1^{-1}$), $[R]_{(k)(k)}$ a diagonal element of a $k^{th}$ row of the new upper triangular matrix ($R_1$); $[R]_{(k)j}$ is a $j^{th}$ element of the $k^{th}$ row of the new upper triangular matrix ($R_1$), $$\frac{[r_1]_k}{[r_1]_{K+1}}$$

is a ratio of the $k^{th}$ element of the last column of the new upper triangular matrix ($R_1$) to the bottom most element of the last column ($r_1$) of the new upper triangular matrix ($R_1$), and (K+1) is a number of users in the new user group.

18. An apparatus comprising:
a processor; and
a computer readable storage medium storing programming for execution by the processor, the programming adapted to efficiently assign transmission parameters in a wireless communications network, and including instructions to:
select users for an initial user group in the wireless communications network, wherein an initial channel matrix (H) corresponds to the initial user group and a transmitter;
perform QR decomposition on an initial Hermitian matrix ($H^H$) associated with the initial user group to obtain an initial unitary matrix (Q) and an initial upper triangular matrix (R);
invert the upper triangular matrix (R) to obtain an initial inverted upper triangular matrix ($R^{-1}$);

add a new user to the initial user group to obtain a new user group in the wireless communications network, the new user group associated with a new Hermitian matrix ($H_1^H$);
perform modulation coding scheme (MCS) adaptation for the new user group, wherein the instructions to perform MCS adaptation for the new user group includes instructions to compute an new unitary matrix ($Q_1$) and a new upper triangular matrix ($R_1$) corresponding to the new Hermitian matrix ($H_1^H$), to compute a last column ($s_1$) of a new inverted upper triangular matrix ($R_1^{-1}$) corresponding to the new upper triangular matrix ($R_1$) directly from at least the new unitary matrix ($Q_1$) and a last column ($r_1$) of the new upper triangular matrix ($R_1$), thereby obtaining the new inverted upper triangular matrix ($R_1^{-1}$) without performing matrix inversion on new upper triangular matrix ($R_1$), and to predict MCSs for users in the new user group in accordance with the new inverted upper triangular matrix ($R_1^{-1}$); and
communicate the MCSs to at least one transmitter in the wireless communications network.

19. The apparatus of claim 18, wherein the instructions to compute the last column ($s_1$) of the new inverted upper triangular matrix ($R_1^{-1}$) corresponding to the new upper triangular matrix ($R_1$) comprise instructions to:

compute the last column ($s_1$) of the new inverted upper triangular matrix ($R_1^{-1}$) in accordance with the formula:

$$[s_1]_k = \begin{cases} \frac{-1}{[R]_{(k)(k)}}\left(\sum_{j=k+1}^{K}[R]_{(k)j}[s_1]_j - \frac{[r_1]_k}{[r_1]_{K+1}}\right), & k=1,\ldots,(K-1) \\ \frac{-[r_1]_K}{[R]_{KK}[r_1]_{K+1}}, & k=K \\ \frac{1}{[r_1]_{K+1}}, & k=K+1, \end{cases}$$

where $[s_1]_k$ is a value for a $k^{th}$ element of the last column ($s_1$) of the new inverted upper triangular matrix ($R_1^{-1}$), $[R]_{(k)(k)}$ is a diagonal element of a $k^{th}$ row of the new upper triangular matrix ($R_1$); $[R]_{(k)j}$ is a $j^{th}$ element of the $k^{th}$ row of the new upper triangular matrix ($R_1$), $$\frac{[r_1]_k}{[r_1]_{K+1}}$$

is a ratio of the $k^{th}$ element of the last column of the new upper triangular matrix ($R_1$) to the bottom-most element of the last column ($r_1$) of the new upper triangular matrix ($R_1$), and (K+1) is a number of users in the new user group.

20. A method for efficiently assigning transmission parameters in a wireless communications network, the method comprising:
adding a first new user to an initial user group to obtain a first new user group in the wireless communications network, the first new user group associated with a first new Hermitian matrix ($H_1^H$); and
computing a first new inverted upper triangular matrix ($R_1^{-1}$) corresponding to the first new Hermitian matrix ($H_1^H$);
adding a second new user to the initial user group to obtain a second new user group in the wireless communications network, the second new user group associated with a second new channel matrix ($H_2$);

computing a second new inverted upper triangular matrix ($R_2^{-1}$) corresponding to the second new Hermitian matrix ($H_2^H$);
adding both the first new user and the second new user to the initial user group to obtain a third new user group in the wireless communications network, the third new user group associated with a third new channel matrix ($H_{12}$);
performing modulation coding scheme (MCS) adaptation for the third new user group, wherein performing MCS adaptation for the third new user group includes:
computing a third new unitary matrix ($Q_{12}$) and a third new upper triangular matrix ($R_{12}$) corresponding to the third new Hermitian matrix ($H_{12}^H$);
computing a last column ($s_{12}$) of a third new inverted upper triangular matrix ($R_{12}^{-1}$) corresponding to the third new upper triangular matrix ($R_{12}$) directly from at least the first new inverted upper triangular matrix ($R_1^{-1}$), a last column ($s_{12}$) of the second new inverted upper triangular matrix ($R_2^{-1}$), the third new Hermitian matrix ($H_{12}^H$), and the third new unitary matrix ($Q_{12}$), thereby obtaining the third new inverted upper triangular matrix ($R_{12}^{-1}$) without performing matrix inversion on the third new upper triangular matrix ($R_{12}$); and
predicting MCSs for users in the third new user group in accordance with the third new inverted upper triangular matrix ($R_{12}^{-1}$); and
communicating the MCSs to at least one transmitter in the wireless communications network.

21. The method of claim 20, wherein computing the last column ($s_{12}$) of the third new inverted upper triangular matrix ($R_{12}^{-1}$) comprises:
computing the last column ($s_{12}$) of the third new inverted upper triangular matrix ($R_{12}^{-1}$) in accordance with the formula:

$$s_{12} = \begin{bmatrix} -R_1^{-1}\begin{bmatrix} [r_2]_{1:K} \\ \alpha \end{bmatrix}\beta^{-1} \\ \beta^{-1} \end{bmatrix},$$

where $$-R_1^{-1}\begin{bmatrix} [r_2]_{1:K} \\ \alpha \end{bmatrix}\beta^{-1}$$

is a vector corresponding to the first K+1 elements of the last column ($s_{12}$) of the new inverted upper triangular matrix ($R_{12}^{-1}$), where $\beta^{-1}$ is the last element of the last column ($s_{12}$) of the new inverted upper triangular matrix ($R_{12}^{-1}$), $R_1^{-1}$ is the first new inverted upper triangular matrix, $[r_2]_{1:K}$ is a column vector containing the first K elements of the last column of the second upper triangular matrix ($R_2$), $\alpha$ is the inner product ($<e_1,h_2^H>$) of the second to last column ($e_1$) of the third new unitary matrix ($Q_{12}$) and the last column of ($h_2^H$) of third new Hermitian matrix ($H_{12}^H$), and $\beta$ is the inner product ($<e_{12},h_2^H>$) of the last column ($e_{12}$) of the third new unitary matrix ($Q_{12}$), and the last column of ($h_2^H$) of third new Hermitian matrix ($H_{12}^H$).

22. The method of claim 20, wherein computing the last column ($s_{12}$) of the third new inverted upper triangular matrix ($R_{12}^{-1}$) comprises:
computing the last column ($s_{12}$) of the third new inverted upper triangular matrix ($R_{12}^{-1}$) in accordance with the formulas:

$$[s_{12}]_{1:K+1} = -\begin{bmatrix} R^{-1}[r_2]_{1:K} - \alpha R^{-1}[r_1]_{1:K}[r_1]_{K+1}^{-1} \\ \alpha[r_1]_{K+1}^{-1} \end{bmatrix}\beta^{-1}$$

and $$[s_{12}]_{K+2} = \beta^{-1},$$

where $[s_{12}]_{1:K+1}$ is a column vector containing the first K+1 elements of the last column ($s_{12}$) the last column ($s_{12}$) of the third new inverted upper triangular matrix ($R_{12}^{-1}$), $[s_{12}]_{K+2}$ is the last element of the last column ($s_{12}$) of the third new inverted upper triangular matrix ($R_{12}^{-1}$), $R^{-1}$ is an initial inverted upper triangular matrix associated with the initial user group, $[r_2]_{1:K}$ is a column vector containing the first K elements of the last column of the second upper triangular matrix ($R_2$), $[r_1]_{1:K}$ is a column vector containing the first K elements of the last column of the first upper triangular matrix ($R_1$), $[r_1]_{K+1}^{-1}$ is the inverse of $[r_1]_{K+1}$, $\alpha$ is the inner product ($<e_1,h_2^H>$) of the second to last column ($e_1$) of the third new unitary matrix ($Q_{12}$) and the last column of ($h_2^H$) of third new Hermitian matrix ($H_{12}^H$), $\beta$ is the inner product ($<e_{12},h_2^H>$) of the last column ($e_{12}$) of the third new unitary matrix ($Q_{12}$), and the last column of ($h_2^H$) of third new Hermitian matrix ($H_{12}^H$), and $\beta^{-1}$ is the inverse of $\beta$.

23. The method of claim 20, wherein computing the last column ($s_{12}$) of the third new inverted upper triangular matrix ($R_{12}^{-1}$) comprises:
obtaining the first K elements ($[s_{12}]_{1:K}$) of the last column ($s_{12}$) of the third new inverted upper triangular matrix ($R_{12}^{-1}$) by: obtaining a first column vector by multiplying the first K elements ($[s_2]_{1:K}$) of the last column of the second new inverted upper triangular matrix ($R_2^{-1}$) by the product of $\beta^{-1}$ and the last element ($[r_2]_{K+1}$) of the second upper triangular matrix ($R_2$); obtaining a second column vector by multiplying the first K elements ($[s_1]_{1:K}$) of the last column of the first new inverted upper triangular matrix ($R_1^{-1}$) by $-\alpha\beta^{-1}$; and adding the first column vector and the second column vector to obtain the first K elements of $s_{12}$;
obtaining a second to last element ($[s_{12}]_{K+1}$) of the last column ($s_{12}$) of the third new inverted upper triangular matrix ($R_{12}^{-1}$) in accordance with the formula: $[s_{12}]_{K+1} = \alpha\beta^{-1}[r_1]_{K+1}^{-1}$; and
obtaining a last element ($[s_{12}]_{K+2}$) of the last column ($s_{12}$) of the third new inverted upper triangular matrix ($R_{12}^{-1}$) in accordance with the formula: $[s_{12}]_{K+2} = \beta^{-1}$,
where $[r_2]_{K+1}$ is a last element of the second upper triangular matrix ($R_2$); $[r_1]_{K+1}^{-1}$ is the inverse of $[r_2]_{K+1}$, $\alpha$ is the inner product ($<e_1,h_2^H>$) of the second to last column ($e_1$) of the third new unitary matrix ($Q_{12}$), and the last column of ($h_2^H$) of third new Hermitian matrix ($H_{12}^H$), and $\beta$ is the inner product ($<e_{12},h_2^H>$) of the last column ($e_{12}$) of the third new unitary matrix ($Q_{12}$), and the last column of ($h_2^H$) of third new Hermitian matrix ($H_{12}^H$), and $\beta^{-1}$ is the inverse of $\beta$.

* * * * *